July 8, 1969   M. GLICK ET AL   3,453,924
DRUM MUTE
Filed Jan. 11, 1968   Sheet 1 of 2

INVENTORS
MERTON GLICK
JOSEPH J. MANCARI
BY
*Stanley J. Rosen*
ATTORNEY

INVENTORS
MERTON GLICK
JOSEPH J. MANCARI
BY
Stanley J. Rosen
ATTORNEY 3,453,924
DRUM MUTE
Merton Glick, 262 Argyle Road, and Joseph J. Mancari, 255 Argyle Road, both of Brooklyn, N.Y. 11218
Filed Jan. 11, 1968, Ser. No. 697,245
Int. Cl. G10d 13/02
U.S. Cl. 84—411        7 Claims

ABSTRACT OF THE DISCLOSURE

A drum mute which comprises a cylindrical rim in which is mounted in its lower portion a drum pad including a sponge rubber disk secured to a substantially rigid compressed cardboard disk. The sponge rubber disk is covered with a sheet of plastic material positioned below the upper edge of the rim. A series of channel-shaped tracks extend across the bottom of the cardboard disk and are secured at their opposite ends to the rim. A plurality of legs are slidably mounted in the tracks and extend therefrom.

Background of the invention

*Field of the invention.*—The invention relates to musical instruments and, more particularly, to means for muting the sound of a drum.

*Description of the prior art.*—While drum practice pads and practice drums have been well known they have not been entirely satisfactory because they adversely affect the drum sound as well as the bounce of the drum stick. Accordingly, while they have helped the practicing drummer in lowering the volume of the drum sound while enabling the drummer to practice drumming motions, nevertheless, all this was accomplished with a concomitant distortion and muffling of the drum sound and a false or nonrepresentative bounce of the drum stick. Moreover, while some practice drums, as for example, the one shown in U.S. Patent No. 3,105,406, have enabled the drummer to practice a rim shot, still the sound provided by such a practice drum was not satisfactory nor was the drum stick bounce satisfactory. In addition, the practice drum could only be used with particular sized drums. It could not be used with drums which had diameters smaller than its own.

Summary

The present invention eliminates the problems just referred to. The drum mute of the present invention can be used with any sized drum, does not distort the drum sound but only lowers its volume, and the drum mute provides the same bounce of the drum stick as does the drum.

More particularly, the drum mute is constructed with legs that rest on the surface of the drum whereby the bottom of the drum mute is above the surface of the drum to form an open space. This open space prevents obstruction of the drum sound while at the same time reducing its volume without distorting it. Moreover, the drum mute includes a rim which has mounted in its bottom a drum pad comprised of a pair of stacked disks which are so constructed as to cause the drum stick to bounce to the same extent as it does when similarly struck against the drum surface. The drummer in every respect during practice duplicates the exact motion and sound as during regular playing, except that the volume of the sound is reduced to a point where it is not disturbing to those in the immediate vicinity of the drummer. Moreover, the loudness of the sound is easily adjusted.

Description of the preferred embodiment

Figure 4:
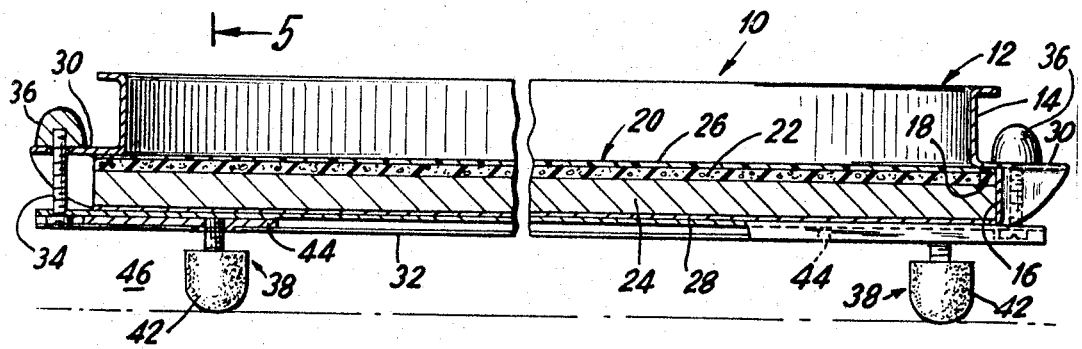
FIG. 4 is a vertical section, with portions cut away, taken on line 4—4 of FIG. 2, but on a larger scale.
Figure 5:
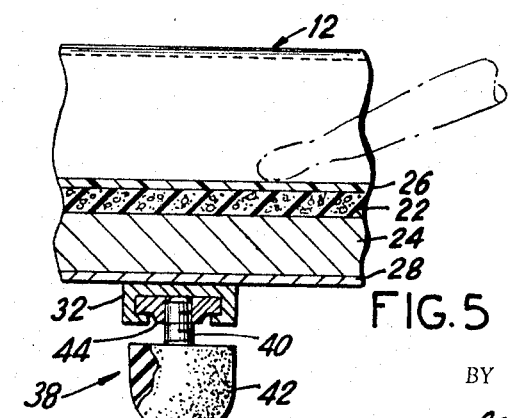
FIG. 5 is a vertical partial section, taken on line 5—5 of FIG. 4.
Figure 2:
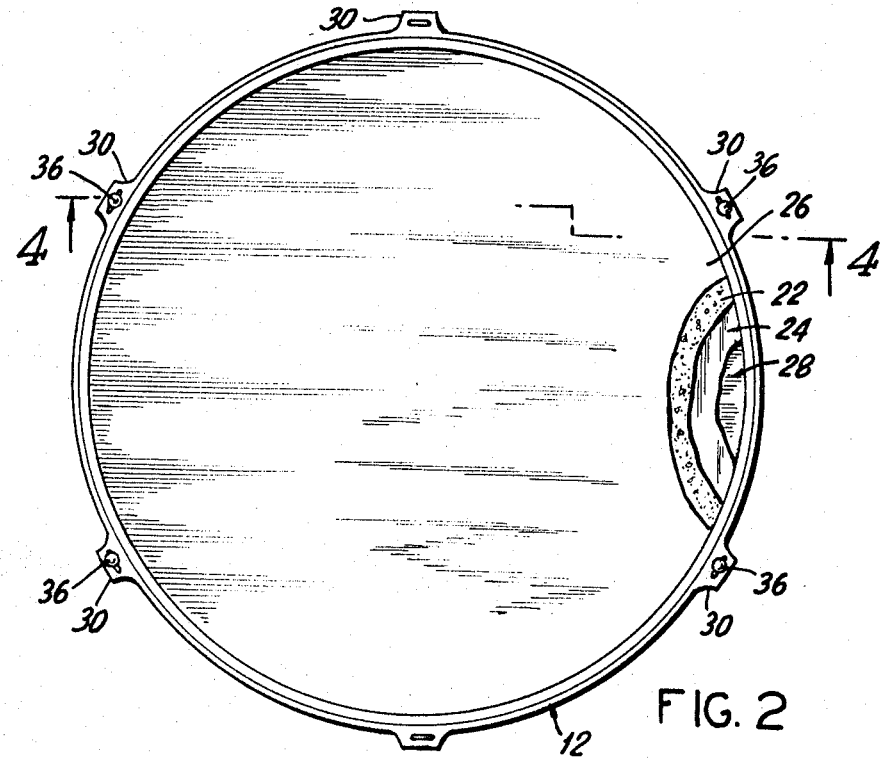
FIG. 2 is a top plan view of the drum mute.

Referring now to the drawings in detail, the drum mute 10 of the present invention comprises a metal cylindrical rim 12 which resembles the rim of a drum. The upper half 14 of the rim is channel-shaped and the lower half 16 extends straight downwardly therefrom and is of slightly larger diameter, as best seen in FIG. 4, to provide a seat 18 for a circular drum pad 20 which forms the bottom of the drum mute.

Pad 20 comprises an upper resilient disk 22 of sponge rubber secured along its bottom surface by a suitable adhesive to the top surface of a lower substantially rigid disk 24 of compressed cardboard. Preferably, the thickness of the sponge rubber is about ⅛″ and the thickness of the compressed cardboard about ⅜″. It should be noted that disk 22 is not foam rubber which was discovered to have insufficient body. A suitable compressed cardboard was discovered to be one available under the trademark "Homosote." The sponge rubber may be white or black and is covered with a thin circular sheet 26 of clear or cloudy plastic material, such as "Mylar," which is suitably secured by adhesive to the upper surface of disk 22. The bottom surface of disk 24 may be covered by a circular sheet 28 of paper secured by adhesive to it.

Figure 3:
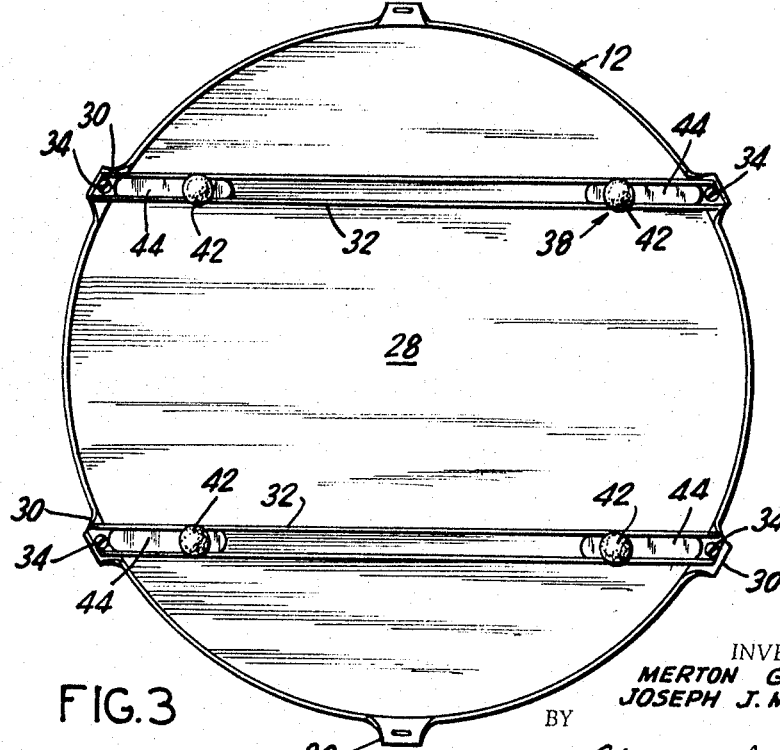
FIG. 3 is a bottom plan view of the drum mute.

Spaced around the circumference of rim 12 are struck-out portions 30 which provide means for securing a series of channel-shaped tracks 32 to the rim. A pair of tracks are shown in FIG. 3 but it will be understood that additional tracks can be provided. The tracks extend across the bottom of pad 20. A fastening bolt 34 extends through each end of the track and through struck-out portion 30 of the rim. Nuts 36 secure each bolt to the rim.

A pair of legs 38 is slidably mounted in each channel of a track. Each leg comprises a bolt 40 covered by a resilient material 42. The bolt is screwed in a shoe 44 that is movable along the track. The leg is locked into position by rotating the screw up against the track. This locks the shoe in the channel of the track. In this manner, the position of the legs can be easily adjusted to accommodate various sizes of drums.

Figure 1:
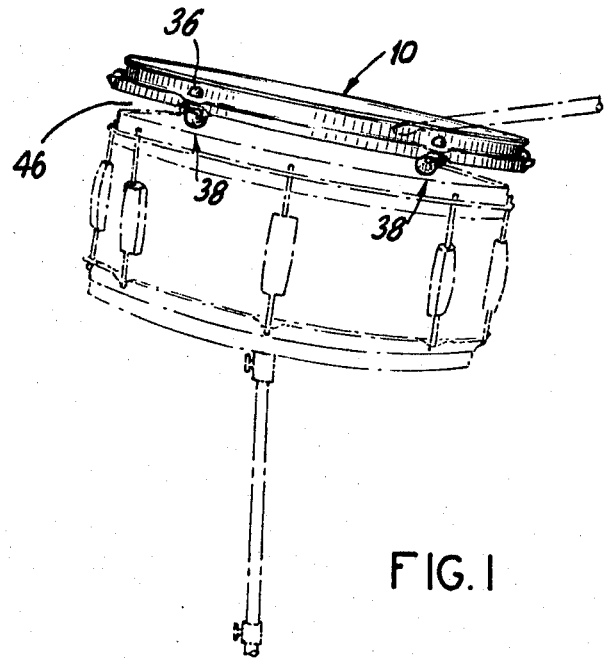
FIG. 1 is a perspective view of the drum mute of the present invention in operative position on the surface of a drum.

It is to be noted that the legs extend downwardly from the pad and rest on the drum surface so that the bottom of the pad is spaced above the drum surface to form an open space 46 (FIGS. 1 and 4). This open space does not hinder the flow of sound so that there are no obstructions which would distort the sound. The sound is exactly the same as would be produced by the drum stick directly striking the surface of the drum but it is lower in volume. The structure of the pad has been found to reproduce the bounce of the drum stick as if the stick had actually struck the drum surface instead of the pad. For different sized drums, the legs are adjustable for proper positioning of the drum mute on the drum surface. Accordingly, the drum diameter can be larger or smaller than the diameter of the drum mute and the drum mute can still be used with such a drum. The volume of the sound can be raised or lowered by shortening or lengthening the legs.

The upper portion 14 of the rim enables the drummer to practice rim shots and the overall appearance of the drum mute closely resembles the appearance of the top of a drum thereby further providing the drummer with a close resemblance to actual drumming on a snare drum or tom-tom while only practicing.

We claim:
1. A drum mute comprising, a cylindrical rim, a disk-shaped drum pad mounted within the lower portion of said rim and comprising a plurality of stacked disks, said disks including an upper resilient one and lower rigid one, and a plurality of supporting members, laterally spaced from each other and mounted below said lower disk and extending therefrom for positioning on the surface of a drum whereby the lower disk is spaced above said drum surface to form an open space therebetween.

2. A drum mute in accordance with claim 1, wherein said resilient disk is a disk of sponge rubber.

3. A drum mute in accordance with claim 2, wherein said rigid disk is a disk of compressed cardboard.

4. A drum mute in accordance with claim 3, wherein a series of channel-shaped tracks extend across the bottom of said cardboard disk, and means fastening the opposite ends of each of said tracks to said rim, said spaced supporting members comprising a plurality of legs slidably mounted in said tracks and extending therefrom.

5. A drum mute in accordance with claim 1, wherein a series of tracks extend across the bottom of said lower disk, and means fastening the opposite ends of each of said tracks to said rim, said spaced supporting members comprising a plurality of legs slidably mounted in said tracks and extending therefrom.

6. A drum mute in accordance with claim 3, wherein the bottom surface of said sponge rubber disk is secured to the top surface of said cardboard disk, and a circular sheet of plastic material is secured to the top surface of said sponge rubber, said circular sheet being spaced below the upper edge of said rim.

7. A drum mute in accordance with claim 6, wherein a series of channel-shaped tracks extend across the bottom of said cardboard disk, and means fastening the opposite ends of each of said tracks to said rim, said spaced supporting members comprising a plurality of legs slidably mounted in said tracks and extending therefrom.

References Cited

UNITED STATES PATENTS

| | | | |
|---|---|---|---|
| 2,565,225 | 8/1951 | Gladstone. | |
| 3,026,759 | 3/1962 | Kleiner et al. | |
| 1,789,992 | 1/1931 | Stevens | 84—411 |
| 2,078,004 | 4/1937 | Lebow | 84—411 |
| 3,105,406 | 10/1963 | Ippolito | 84—411 |
| 3,264,926 | 8/1966 | Belli | 84—411 |

RICHARD B. WILKINSON, *Primary Examiner.*

JOHN F. GONZALES, *Assistant Examiner.*